Dec. 22, 1942.    J. R. THORP    2,306,007
TOW COUPLING
Filed June 7, 1941    2 Sheets-Sheet 2
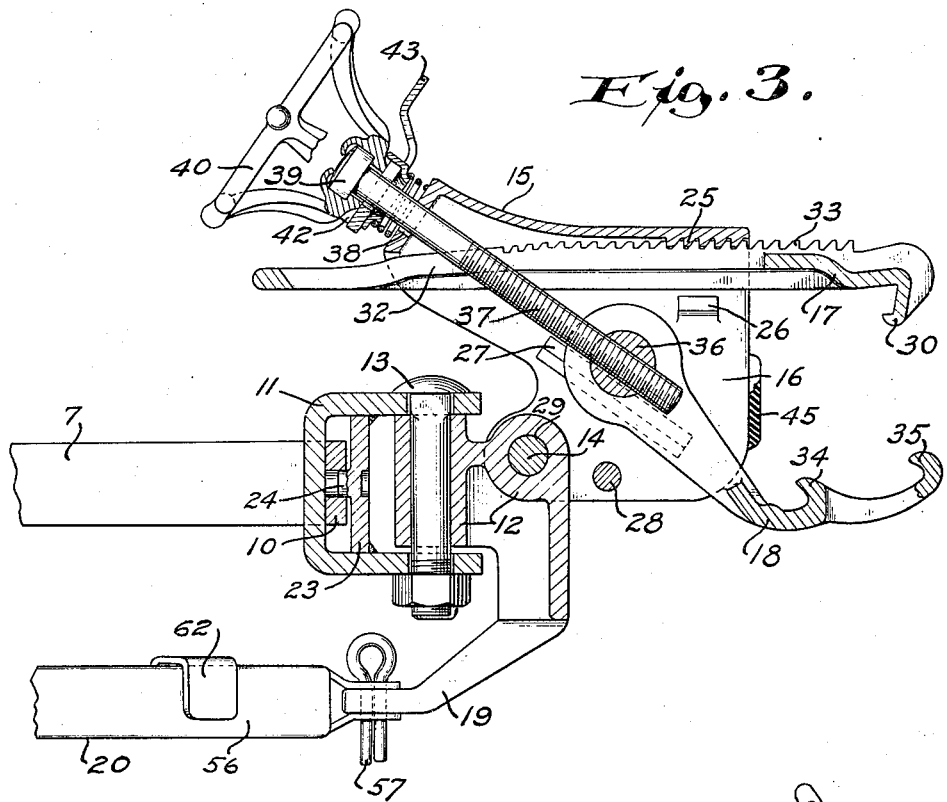
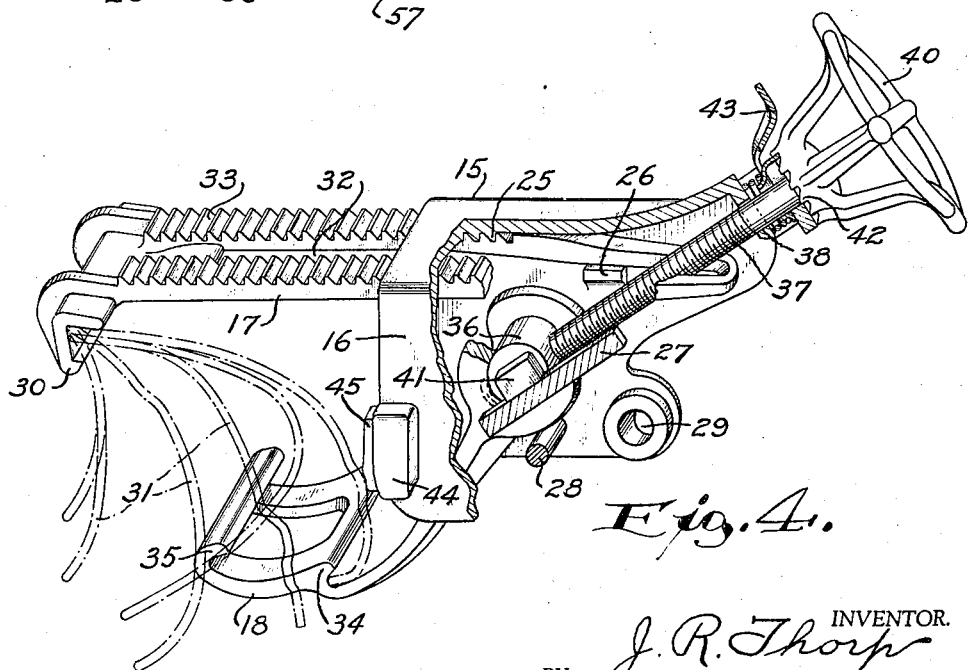
INVENTOR.
J. R. Thorp
BY Lieber & Lieber
ATTORNEYS.

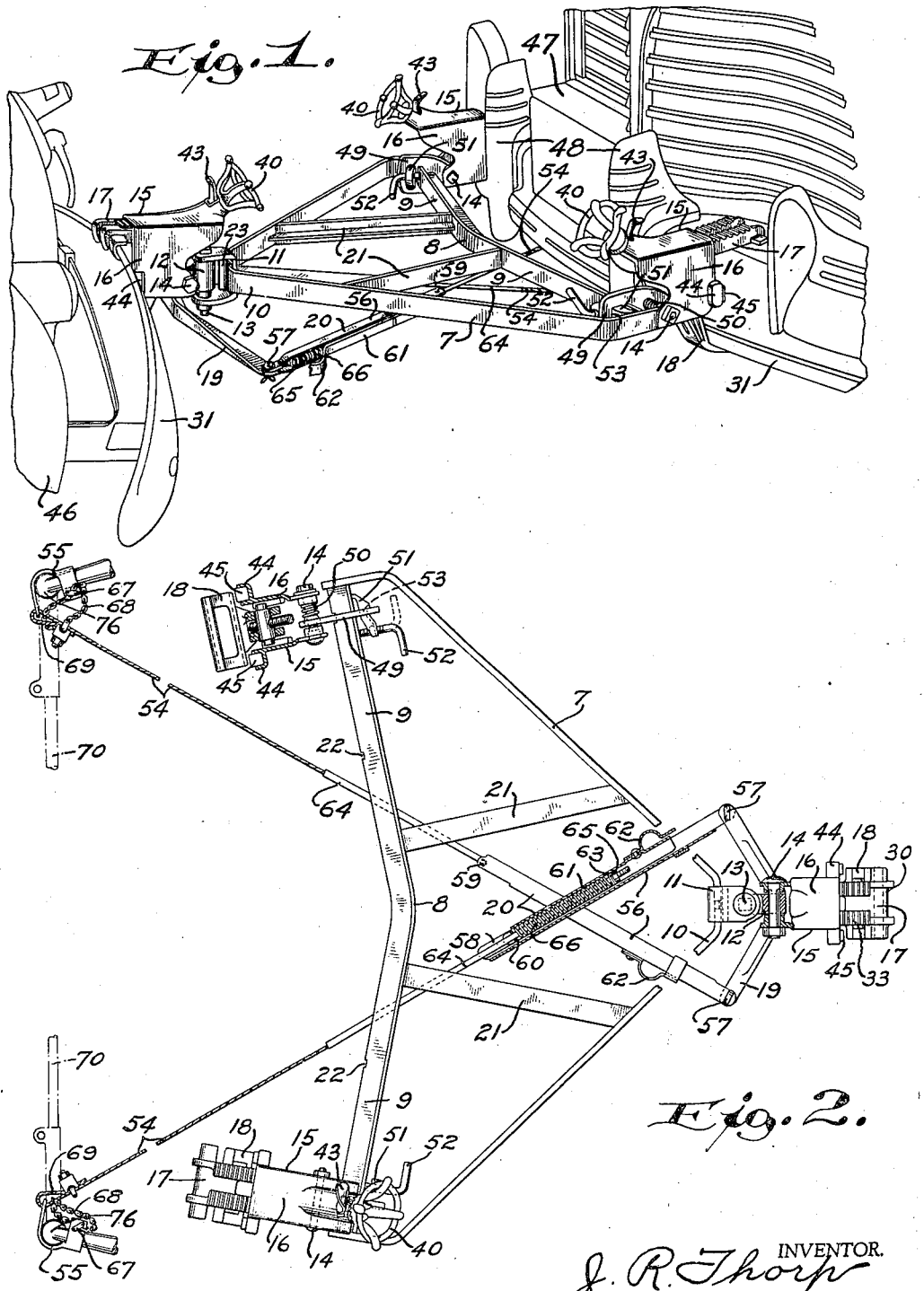

Patented Dec. 22, 1942

2,306,007

UNITED STATES PATENT OFFICE 2,306,007

TOW COUPLING

Joel R. Thorp, West Allis, Wis., assignor to The Fulton Company, West Allis, Wis., a corporation of Wisconsin Application June 7, 1941, Serial No. 396,992

14 Claims. (Cl. 280—33.44)

This invention relates generally to improvements in hauling apparatus, and relates more particularly to various improvements in the construction and operation of coupling devices for facilitating towing or haulage of one vehicle or the like, by another.

An object of the invention is to provide a new and useful tow coupling which is relatively simple and durable in construction, and which is moreover highly efficient and flexible in use.

Many different types of hauling appliances for connecting a trailer to a draft vehicle, have heretofore been proposed, and when the pulling and drawn vehicles are specially formed and equipped for such operation, no serious problems arise. However, when it is attempted to provide an emergency coupling for facilitating detachable attachment of a disabled automobile to the rear of another motor vehicle, both provided with front and rear bumpers of varied and odd cross-section constituting the only convenient means for attachment of the draft mechanism, many difficulties are encountered. The end bumpers, besides being of many different contours, are also frequently utilized to support bumper guards and other attachments of diverse construction, some of which are so formed that they leave only slight local areas available for purposes of attaching coupling members to the bumpers. An emergency hauling assembly of this kind should also be quickly and conveniently firmly attachable to the bumpers, and readily detachable therefrom, and must have sufficient strength to resist rough usage and abuse. It is also desirable that such an emergency tow coupling be cooperable with the steering mechanism of the drawn vehicle so as to insure proper automatic steerage of the trailer especially when traversing curves, and none of the prior emergency towing assemblages meet with these various requirements.

It is therefore a more specific object of my present invention to provide an improved tow coupling which is especially adapted for cooperation with the bumpers of diverse automobiles, and which can be readily adjusted to meet diverse conditions of use.

Another specific object of the present invention is to provide an improved tow bar for bumper equipped vehicles, which is simple and durable in construction, and which may be quickly applied and removed.

A further specific object of my invention is to provide a vehicle haulage coupling having improved means for properly guiding the trailing vehicle.

Still another specific object of the invention is to provide an improved attaching clamp for tow couplings or the like, which may be caused to effectively coact with bumpers or similar parts having various shapes.

An additional specific object of this invention is to provide a coupling assemblage in which the attaching elements may be most effectively positioned and distributed so as to insure safe haulage of trailers.

Another specific object of the present invention is to provide an improved coupling of simple structure wherein various parts are of similar construction and therefore interchangeable.

A further specific object of my invention is to provide an improved tow bar assemblage which can be manufactured and sold at moderate cost, and which may be safely applied and utilized by a novice.

These and other specific objects and advantages of the invention will be apparent from the following detailed description.

A clear conception of the several improved features, and of the construction and operation of tow couplings embodying the invention, may be had by referring to the drawings accompanying and forming a part of this specification wherein like reference characters designate the same or similar parts in the various views.

Fig. 1 is a perspective view showing one of the improved tow couplings interposed between, and attached to the bumpers of hauling and trailing automobiles;

Fig. 2 is a part sectional top view of the tow coupling assemblage in reverse position, showing portions broken away and some parts in section;

Fig. 3 is a longitudinal vertical section through one of the gripping clamps; and Fig. 4 is an enlarged perspective view of one of the clamps with portions thereof broken away, and showing various shapes of bumpers to which the same is applicable, in dot-and-dash lines.

While the features of the invention have been shown and described herein as being embodied in a triangular tow coupling having three clamps especially cooperable with sheet metal bumpers, and provided with an automatic steering rig, it is not my intent to thereby unnecessarily restrict the scope or utility of any of the improved features.

Referring to the drawings, the improved tow bar or coupling assemblage comprises in general, a flat approximately triangular tow bar or member 7 having a transverse base bar 8 depressed at its center to provide two straight sections 9 disposed at an obtuse angle relative to each other, and also having a central apex portion 10 at its end remote from the bar 8 provided with a swivel clevis 11; a universal joint associated with the apex portion 10 and consisting of a block 12 swingably associated with an upright pin or bolt 13 coacting with the clevis 11, and with a horizontal pin or bolt 14; three interchangeably similar fastening or clamping assemblages 15 each consisting of a frame 16, and upper and lower jaw elements 17, 18 respectively, adjustably connected to the frame 16, two of the assemblages being adjustably associated with the straight bar sections 9 and the third being swingably cooperable with the pivot bolt 14; and automatic steering mechanism composed of a transverse lever or bar 19 secured to the block 12, and adjustable cross-connections 20 adapted to be secured to the steering assemblage of a trailing vehicle.

The rigid draft member 7 may be formed of standard bar stock sections welded or otherwise firmly united, and may be reenforced by braces 21 as shown in Figs. 1 and 2. The bar sections 9 of the member 7 may be provided with series of notches 22 on the outer edges thereof, for facilitating positioning of the clamping assemblages 15, and the clevis 11 may be secured to the apex end 10 so as to permit slight swivel action, by means of a plate 23 welded or otherwise rigidly attached to the clevis and having an integral dowel 24 coacting with a hole in the member 7 as shown in Fig. 3. The universal joint comprising the block 12 coacting with the bolts 13, 14 is also shown in Fig. 3, and affords a universal motion permitting draft connection between the front end 10 of the draft bar and the front clamping assemblage 15.

Each of the three improved attaching assemblages 15, is interchangeable with all others and comprises an inverted U-shaped frame 16 having a series of projections or teeth 25 at its top, and parallel horizontal inward projections or lugs 26 on its side walls directly beneath the teeth 25, and other parallel but inclined projections or slides 27 on the side walls beneath the lugs 26, see Figs. 3 and 4. The projections 25, 26, 27 may all be formed integral with the frame 16, and the lower portions of the side walls may be rigidly united by a tie rod 28 and are provided with alined holes 29 for reception of the attaching bolts. The upper jaw element 17 of each assemblage 15, is provided at its outer end with a hook 30 adapted to engage the upper edge of any one of various standard automobile bumpers 31 shown in dot-and-dash lines in Fig. 4, and has a longitudinal slot 32 extending toward its inner end; while the upper medial portion thereof is provided with a series of upwardly directed transverse projections or teeth 33 adapted to interlock with the frame teeth 25. The teeth 25, 33 are oppositely directed as shown in Figs. 3 and 4 so as to positively prevent possible slippage, and the lugs 26 are so spaced from the teeth 25 that the elongated upper jaw 17 can drop out of engagement with these teeth 25 in order to permit longitudinal adjustment of the upper jaw relative to the frame 16. The lower hook or jaw element 18 of each clamping assemblage 15, is provided at its lower outer end with two spaced hooks 34, 35 adapted to engage the lower edge of any one of the various shaped automobile bumpers 31; and has its upper inner end suspended from a heavy transverse pin 36 the center of which coacts with the lower end of a screw threaded adjusting stem 37, and the opposite flattened ends 41 of which slidably engage the fixed slides 27 of the frame 16. Each of the threaded adjusting stems 37 extends upwardly through an opening 38 in the upper extremity of the frame 16, and has its upper end provided with a square head 39 with which a manipulating handle 40 coacts, and these handles 40 are each provided with locking teeth 42 engageable with a spring pressed locking latch 43 as shown in Figs. 3 and 4. The front or outer portions of the side walls of each frame 16, are also provided with pockets 44 within which resilient reaction blocks 45 of rubber or the like are confined, as clearly illustrated in Figs. 2 and 4.

While the clamping assemblage 15 of the draft vehicle 46 shown in Fig. 1, is universally pivotally connected to the apex portion 10 of the draw bar or member 7, the assemblages 15 which coact with the bumper 31 of the trailing vehicle 47 are preferably rigidly connected to the draft bar sections 9 in such manner as to permit adjustment of the rear assemblages 15 so as to clear bumper guards 48 or other attachments associated with the front bumper 31 of the trailer. Such adjustability is obtained by means of a special clamping attachment shown in Figs. 1 and 2, and each of these clamping rigs comprises a draft plate 49 pivotally suspended from the adjacent transverse bolt 14 but being frictionally restrained against free swinging by a compression spring 50 embracing the suspension bolt 14; a clamping lever 51 extending through an opening 53 in each plate 49 and coacting with this plate and with the adjacent bar section 9; and an adjusting or jack screw 52 having screw thread coaction with an end of the lever 51 and coacting with the bar section 9 on the opposite side of the plate 49. When the screw 52 is released, the plate 49 and the corresponding assemblage 15 may be adjusted freely along the adjacent draft bar section 9, and may be positioned within a selected notch 22, but when the screw 52 is manipulated to swing the lever 51 away from the adjacent bar section 9, the draft plate 49 will be firmly locked to the bar 8 in the desired position of adjustment. The front and rear transverse vehicle bumpers 31 may of course be of any of the several cross-sectional shapes shown in Fig. 4, and are ordinarily constructed of heavy sheet metal.

If the trailing vehicle 47 is equipped with steering mechanism, it is desirable to either have a driver occupy this vehicle in order to effect steering, or to provide automatic steering gear whereby positive steering of the trailer will be effected by changes in the direction of advancement of the draft vehicle 46. This automatic steering assemblage comprises the transverse bar 19 which is formed integral with or rigidly attached to the universal joint block 12 and projects on opposite sides thereof; and the adjustable cross-connections 20 which extend rearwardly beneath the draft member 7 and have their rear ends attachable by means of cables 54 and clamps 55 to the steering knuckles 76 of the trailing vehicle 46. Each of the cross-connections 20 consists of a U-shaped elongated casing 56 having its forward end pivotally attached to an end of the bar 19 by means of a cotter pin 57; a bracket 58 pivotally attached to the opposite end of the casing 56 by pivots 59 and having an off-set end flange 60; another casing 61 removably confined within the casing 56 by means of a pivot latch 62 and having an internal flange 63 spaced from the flange 60 of the bracket 58; a threaded rod 64 piercing the flanges 60, 63 and having one end firmly connected to the corresponding cable 54 while its opposite end is provided with a nut 65 coacting with the flange 63; and a helical compression spring 66 embracing the rod 64 and coacting with the adjacent faces of the two flanges 60, 63. The clamps 55 are adapted to be firmly secured to the steering knuckles 76 with the aid of pins 67 carried by chains 68 secured to the cable loops 69 to which the clamps are also attached, and the knuckles 76 are ordinarily connected by a drag link 70 and are associated with the front steering wheels of the trailing vehicle. The structure for properly tensioning the cables 54 through the springs 66 is such, that each cable may be independently adjusted after its clamp 55 has been attached to the corresponding steering knuckle 76; by merely releasing the latch 62, swinging the casing section 61 out of the casing 56 about the pivots 59, and properly adjusting the nut 65; and the steering motion is transmitted from one casing section to the other and to the cables 54 through the tensioned springs 66.

During normal use of the improved tow coupling, the trailer and draft vehicles should be provided with front and rear bumpers 31 respectively, and these bumpers may or may not be equipped with bumper guards 48, and may have any of the various cross-sectional shapes illustrated in Fig. 4. The coupling assemblage 15 which is associated with the apex portion 10 of the draft member 7 through the universal joint, should then be applied centrally of the rear bumper 31 of the draft vehicle 46 in the manner shown in Fig. 1, and the laterally separated rear coupling assemblages 15 should be rigidly associated with the front bumper 31 of the trailing vehicle 47 so as to position the apex portion 10 as near the central plane of the trailing vehicle as possible. Final clamping of the coupling assemblages 15 to the adjacent bumpers 31 may obviously be effected after the bumpers have been properly positioned with respect to the hooks 30, 34, 35, by manipulating the hand wheels 40, and when clamping has been thus effected, the latches 43 will hold the hand wheels 40 in the adjusted positions. If the trailing vehicle is provided with steering mechanism as shown in Figs. 1 and 2, then the cross connections 20 should be assembled and associated with the steering knuckles 76 of the trailing vehicle 47, as illustrated. The draft vehicle 46 may thereafter be operated to haul the trailer or trailing vehicle 47, and as the draft vehicle is transported around curves, the cross connections 20 will automatically steer the trailing vehicle 47 and cause the same to traverse similar paths. The application of the tow coupling to a trailer, can obviously be quickly and readily effected and will permit haulage of a trailer without having anyone in attendance of the trailer. After the trailing vehicle has been hauled to its destination, the tow assemblage can be readily removed, by merely manipulating the hand wheels 40 to release the clamps, and by removing the clamp assemblages 15 and the clamps 55 from the bumpers and steering knuckles respectively.

During application of the attaching assemblages to bumpers of different shapes, the bumper 31 may be caused to coact with the upper hooks 30, and with either set of lower hooks 34, 35, depending upon the specific shape of the bumper. When clamping is being effected, the medial portion of the bumper 31 will engage the resilient blocks 45 and during manipulation of the handle 40, the effective lower hooks 34 or 35 will cause the upper edge of the bumper to be driven into firm engagement with the upper hook 30. Initial engagement of the hooks 30, 34, 35 with the edges of the bumper 31, may be effected by merely adjusting the upper jaw 17 inwardly or outwardly and by permitting the teeth 33 to engage the teeth 25 when the initial adjustment has been completed. When the lower jaw element 18 is subsequently drawn upwardly by rotation of the screw rod 37, the bumper 31 will be clamped in position and the assemblages 15 may be thus applied to bumpers of different cross-sectional shapes. The resilient blocks 45 coacting with the outer medial portion of the bumper 31 will augment the clamping effect without damaging the polished outer faces of the bumpers.

The improved automatic steering mechanism may also be readily applied and quickly adjusted to properly cooperate with vehicles of various constructions, by virtue of the adjustment afforded by the rods 64 and the nuts 65 coacting therewith. With the aid of these nuts 65, the tension of the spring 66 may be varied to suit different conditions, and the latches 62 will permit convenient access to the adjusting nuts 65. The clamps 55 may be conveniently attached to the steering knuckles 76, and released therefrom, and in cases where automatic steering is not desired, the cross-sections 20 may be removed from the bar 19 by merely withdrawing the cotter pins 57.

From the foregoing detailed description it will be apparent that my present invention provides an improved tow coupling which besides being simple and durable in construction, is highly efficient and flexible in use. The improved assemblage may be utilized either with or without automatic steering, and by virtue of the fact that the coupling assemblages 15 are all of light and interchangeable construction, the tow coupling can be manufactured and sold at moderate cost. The coupling assemblages 15 are adapted to effectively cooperate with bumpers of various shapes, and may be quickly and readily adjusted to accommodate different conditions of operation. The universal joint provided between the frame 7 and the front coupling assemblage 15 prevents binding such as would tend to cause breakage of parts, and also permits the trailing vehicle to ride over uneven surfaces without undesirably interfering with the movement of the hauling vehicle. While the assemblage is especially adapted for use in conjunction with automobiles having front and rear bumpers, it can obviously be utilized on other types of vehicles than automobiles, and the improved tow bar has proven highly successful in actual use and provides an extremely durable and reliable towing assemblage.

It should be understood that it is not desired to limit this invention to the exact details of construction or to the precise mode of use, herein shown and described, for various modifications within the scope of the claims may occur to persons skilled in the art.

I claim:

1. In combination, a draft member, a frame suspended from said draft member and having a series of upper teeth and lower inclined slides and an end abutment between said teeth and slides, an upper jaw element adjustable along said tooth series, and a lower jaw element adjustable along said slides to clamp a bumper coacting with both of said elements against said abutment.

2. In combination, a draft member, a frame having a top provided with a series of teeth and side walls provided with inclined parallel surfaces, an abutment on said frame between said teeth and said surfaces, an upper jaw element adjustable horizontally along said tooth series, and a lower jaw element adjustable along said surfaces to clamp an intervening bumper against said abutment.

3. In combination, a draft member, an inverted U shaped frame suspended from said member and having opposite side walls, a resilient abutment at one end of said frame, an upper jaw element fixedly adjustable within said frame above said abutment, a lower jaw element confined within said frame beneath said upper element and between said side walls, a suspension pivot for said lower jaw element slidable along said frame, and a threaded rod journalled in said frame and coacting directly with said suspension pivot to cause said lower jaw element to clamp a bumper coacting with said upper element against said abutment.

4. In combination, a draft member, a frame pivotally suspended at one end from said member and having a resilient abutment at its opposite end, an upper jaw element horizontally adjustable within said frame above said abutment, a lower jaw element movable within said frame, a suspension pivot for said lower jaw element slidable upon said frame at an oblique angle relative to said upper jaw element and beneath said abutment, and means for adjusting said lower jaw element pivot to clamp an intervening bumper firmly against said abutment.

5. In combination, a draft member, a frame pivotally suspended at one end from said member and having a resilient abutment a its opposite end, an upper jaw element horizontally adjustable within said frame above said abutment, a lower jaw element movable within said frame at an oblique angle beneath said abutment, a suspension pivot for said lower jaw element slidable along said frame, a threaded rod journalled in said frame and coacting with said lower jaw element pivot to clamp an intervening bumper against said abutment, and means for locking said rod in adjusted position.

6. In combination, a draft member, a rigid frame suspended from said member and having a series of teeth, a jaw having a shank provided with teeth interengageable with said frame teeth to permit fixed positioning of said jaw at different distances away from said frame, another jaw swingable toward and away from said first mentioned jaw about a pivot slidable upon said frame and being adjustable at an oblique angle relative to the direction of adjustment of said first mentioned jaw, and means journalled in said frame and having screw thread coaction with said pivot for relatively moving said jaws.

7. In combination, a draft member, a rigid frame suspended from said member and having a series of teeth, a jaw having a shank provided with teeth interengageable with said frame teeth to permit fixed positioning of said jaw at different distances away from said frame, another jaw swingable toward and away from said first mentioned jaw about a pivot which is directly slidable upon said frame and being adjustable at an oblique angle relative to the direction of adjustment of said first mentioned jaw, a buffer block associated with said frame between said jaws, and a threaded rod journalled in said frame and coacting with said pivot for relatively moving said jaws.

8. In combination, a draft member, a rigid frame suspended from said member and having a rectilinear series of teeth depending from a transverse wall thereof, a jaw having an elongated shank provided with teeth co-operable with said frame teeth to effect adjustment of said jaw relative to said frame along a plane, a second jaw swingable about a pivot toward and away from said first mentioned jaw, said pivot being adjustable along a plane disposed at an oblique angle to the plane of adjustment of said first mentioned jaw, and means having screw thread coaction directly with said pivot for relatively moving said jaws.

9. In combination, a draft member, a rigid frame suspended from said member and having a rectilinear series of teeth depending from a transverse wall thereof, a jaw having an elongated shank provided with teeth co-operable with said frame teeth to effect adjustment of said jaw relative to said frame along a plane, a second jaw swingable toward and away from said first mentioned jaw and being adjustable along a plane disposed at an oblique angle to the plane of adjustment of said first mentioned jaw, and means for relatively moving said jaws, said moving means extending through the shank of said first mentioned jaw and coacting with the pivot of said second jaw.

10. In combination, a draft member, a rigid frame suspended from said member and having a rectilinear series of teeth depending from a transverse wall thereof, a jaw having an elongated shank provided with teeth co-operable with said frame teeth to effect adjustment of said jaw relative to said frame along a plane, a second jaw swingable toward and away from said first mentioned jaw and being adjustable along a plane disposed at an oblique angle to the plane of adjustment of said first mentioned jaw, and an adjusting screw for said second jaw piercing said shank and being journalled for rotation in said frame.

11. In combination, a draft member, a frame suspended from said member and having a series of teeth and an inclined slide spaced from said teeth and an abutment between said teeth and slide, a jaw adjustable along said tooth series, and another jaw adjustable along said slide to clamp a bumper coacting with both of said jaws against said abutment.

12. In combination, a draft member, a frame suspended from said member and having a series of teeth and an inclined slide spaced from said teeth and an abutment between said teeth and slide, a jaw adjustable along said tooth series, a pivot element adjustable along said slide, another jaw swingably suspended from said pivot, and means for moving said pivot relative to said frame to cause said jaws to clamp an intervening bumper against said abutment.

13. In combination, a draft member, a frame suspended from said member and having a series of teeth and parallel inclined slides spaced from said teeth and an abutment between said teeth and slides, a jaw having an elongated shank provided with teeth adjustably co-operable with said frame teeth, another jaw swingable toward and away from said first mentioned jaw and being adjustable along said slides, and adjusting means for said swingable jaw extending through the shank of said first mentioned jaw.

14. In combination, a draft member, a frame suspended from said member and having a series of teeth and parallel inclined slides spaced from said teeth and an abutment between said teeth and slides, a jaw having an elongated toothed shank adjustable along said frame teeth, a second jaw adjustable along said slides, and means for moving said second jaw along said slides to clamp a bumper coacting with both of said jaws against said abutment, said means piercing said jaw shank.

JOEL R. THORP.